United States Patent
Lee et al.

(10) Patent No.: US 10,757,643 B2
(45) Date of Patent: Aug. 25, 2020

(54) METHOD AND APPARATUS FOR WIRELESS COMMUNICATION

(71) Applicant: Samsung Electronics Co., Ltd., Suwon-si, Gyeonggi-do (KR)

(72) Inventors: Ok-Seon Lee, Suwon-si (KR); Sin-Seok Seo, Seongnam-si (KR); Young-Suk Sun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/004,058

(22) Filed: Jun. 8, 2018

(65) Prior Publication Data

US 2018/0359689 A1   Dec. 13, 2018

(30) Foreign Application Priority Data

Jun. 8, 2017   (KR) .......................... 10-2017-0071553

(51) Int. Cl.
*H04W 48/00*   (2009.01)
*H04W 48/18*   (2009.01)
*H04W 36/30*   (2009.01)
*H04W 48/16*   (2009.01)

(52) U.S. Cl.
CPC .......... *H04W 48/18* (2013.01); *H04W 36/30* (2013.01); *H04W 48/16* (2013.01)

(58) Field of Classification Search
CPC ...... H04W 48/18; H04W 48/16; H04W 36/30
See application file for complete search history.

(56) References Cited

U.S. PATENT DOCUMENTS

| 8,271,025 | B2 | 9/2012 | Brisebois et al. |
| 8,615,236 | B2 | 12/2013 | Kashikar et al. |
| 8,817,678 | B2 * | 8/2014 | Moshfeghi ............. H04B 7/024 370/310 |
| 8,989,734 | B2 | 3/2015 | Ekici et al. |
| 9,380,534 | B2 | 6/2016 | Harrison et al. |

(Continued)

FOREIGN PATENT DOCUMENTS

| JP | 2014007563 A | 1/2014 |
| KR | 10-1276607 B1 | 6/2013 |

OTHER PUBLICATIONS

International Search Report dated Sep. 5, 2018 in connection with International Patent Application No. PCT/KR2018/006482.

(Continued)

*Primary Examiner* — Khai M Nguyen

(57) ABSTRACT

Disclosed is a 5G or a pre-5G communication system to support a higher data transmission rate than a system after a 4G communication system such as LTE. A wireless communication method by a terminal according to one embodiment may include the operations of: identifying information indicating a type of each of multiple wireless networks, a strength of each of signals received from the multiple wireless networks, respectively, and power consumption of the terminal; selecting one wireless network among the multiple wireless networks on the basis of the information and the strength of each of current signals received from the multiple wireless networks, respectively; and communicating with the selected wireless network.

12 Claims, 12 Drawing Sheets

(56) References Cited

U.S. PATENT DOCUMENTS

| | | | |
|---|---|---|---|
| 2005/0048960 A1* | 3/2005 | Yamauchi | H04W 52/0267 455/418 |
| 2006/0092890 A1* | 5/2006 | Gupta | H04W 4/029 370/338 |
| 2008/0192681 A1 | 8/2008 | Lee et al. | |
| 2008/0259845 A1 | 10/2008 | Roh et al. | |
| 2010/0184440 A1 | 7/2010 | Mao et al. | |
| 2011/0195743 A1 | 8/2011 | Jee et al. | |
| 2011/0286344 A1 | 11/2011 | Hanaoka et al. | |
| 2013/0045744 A1* | 2/2013 | Dimpflmaier | H04W 36/14 455/437 |
| 2013/0084855 A1 | 4/2013 | Ekici et al. | |
| 2013/0225161 A1 | 8/2013 | Chhabra et al. | |
| 2013/0336287 A1 | 12/2013 | Abraham et al. | |
| 2014/0003263 A1 | 1/2014 | Sheriff et al. | |
| 2014/0334335 A1* | 11/2014 | Barathalwar | H04W 48/16 370/254 |
| 2014/0362713 A1* | 12/2014 | Agarwal | H04W 24/08 370/252 |
| 2015/0312921 A1 | 10/2015 | Du et al. | |

OTHER PUBLICATIONS

Written Opinion of the International Searching Authority dated Sep. 5, 2018 in connection with International Patent Application No. PCT/KR2018/006482.

Supplementary Partial European Search Report in connection with European Application No. 18814290.5 dated Mar. 3, 2020, 14 pages.

* cited by examiner

301

| WIRELESS NETWORK | SIGNAL STRENGTH | POWER CONSUMPTION |
|---|---|---|
| Wi-Fi | STRONG<br>FAIR<br>WEAK | a<br>b<br>c |
| 3G | STRONG<br>FAIR<br>WEAK | d<br>e<br>f |
| 4G | STRONG<br>FAIR<br>WEAK | g<br>h<br>i |

| WIRELESS NETWORK | SIGNAL STRENGTH | TERMINAL STATE | POWER CONSUMPTION |
|---|---|---|---|
| Wi-Fi | STRONG | ACTIVE<br>TRANSITION<br>IDLE | j<br>k<br>l |
| | FAIR | ACTIVE<br>TRANSITION<br>IDLE | m<br>n<br>o |
| | WEAK | ACTIVE<br>TRANSITION<br>IDLE | p<br>q<br>r |
| 3G | STRONG | ACTIVE<br>TRANSITION<br>IDLE | s<br>t<br>u |
| | FAIR | ACTIVE<br>TRANSITION<br>IDLE | v<br>w<br>x |
| | WEAK | ACTIVE<br>TRANSITION<br>IDLE | y<br>z<br>aa |
| 4G | STRONG | ACTIVE<br>TRANSITION<br>IDLE | bb<br>cc<br>dd |
| | FAIR | ACTIVE<br>TRANSITION<br>IDLE | ee<br>ff<br>gg |
| | WEAK | ACTIVE<br>TRANSITION<br>IDLE | hh<br>ii<br>jj |

| WIRELESS NETWORK | TERMINAL STATE | POWER CONSUMPTION |
|---|---|---|
| Wi-Fi | ACTIVE<br>TRANSITION<br>IDLE | kk<br>ll<br>mm |
| 3G | ACTIVE<br>TRANSITION<br>IDLE | nn<br>oo<br>pp |
| 4G | ACTIVE<br>TRANSITION<br>IDLE | qq<br>rr<br>ss |

METHOD AND APPARATUS FOR WIRELESS COMMUNICATION

CROSS-REFERENCE TO RELATED APPLICATION AND CLAIM OF PRIORITY

This application is based on and claims priority under 35 U.S.C. § 119(a) to Korean Patent Application Serial No. 10-2017-0071553 filed on Jun. 8, 2017 in the Korean Intellectual Property Office, the disclosure of which is incorporated herein by reference in its entirety.

BACKGROUND

1. Field

Various embodiments relates to a wireless communication method and apparatus and, specifically, a method and apparatus configured to perform wireless communication by selecting a wireless network for data transmission or reception according to a pre-configured criterion.

2. Description of Related Art

In order to meet wireless data traffic demands that have increased after $4^{th}$ Generation (4G) communication system commercialization, efforts to develop an improved $5^{th}$ Generation (5G) communication system or a pre-5G communication system have been made. For this reason, the 5G communication system or the pre-5G communication system is called a beyond 4G network communication system or a post-LTE system.

In order to achieve a high data transmission rate, implementation of the 5G communication system in a mmWave band (for example, 60 GHz band) is being considered. In the 5G communication system, technologies such as beamforming, massive MIMO, Full Dimensional MIMO (FD-MIMO), an array antenna, analog beam-forming, and a large scale antenna are discussed to mitigate a propagation path loss in the mmWave band and increase a propagation transmission distance.

Further, technologies such as an evolved small cell, an advanced small cell, a cloud Radio Access Network (cloud RAN), an ultra-dense network, Device to Device communication (D2D), a wireless backhaul, a moving network, cooperative communication, Coordinated Multi-Points (CoMP), and interference cancellation have been developed to improve the system network in the 5G communication system.

In addition, the 5G system has developed Advanced Coding Modulation (ACM) schemes such as Hybrid FSK and QAM Modulation (FQAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA).

Along with development of communication technologies, electronic devices are evolving into a form supporting various types of Radio Access Technology (RAT). Accordingly, electronic devices can select an optimal RAT according to an environment to perform communication. However, since electronic device restrictively receive electric power supplied thereto, it is required to consider power consumption at the time of RAT selection. Meanwhile, when quality of a network to which a terminal is connected is degraded, Quality of Experience (QoE) of a user is degraded and inconvenience to the user arises therefrom. For this reason, a scheme to solve the inconvenience caused by degradation is required.

SUMMARY

Various embodiments provide a wireless communication method and apparatus.

More particularly, various embodiments provide a method and apparatus configured to perform wireless communication by selecting a wireless network, so as to enable minimization of power consumption.

Further, various embodiments provide a method and apparatus configured to perform wireless communication by selecting a wireless network so as to enable maximization of quality of experience of a user.

A wireless communication method by a terminal according to one embodiment may include the operations of: identifying mapping information comprising a type of each of multiple wireless networks, a strength of each of signals received from the multiple wireless networks, respectively, and power consumption of the terminal; selecting a wireless network among the multiple wireless networks on the basis of the mapping information and the strength of each of current signals received from the multiple wireless networks, respectively; and communicating with the selected wireless network.

A wireless communication method by a terminal according to another embodiment may include the operations of: detecting degradation of Quality of Experience (QoE) of an application which is running in the foreground; selecting, among multiple wireless networks, a wireless network different from a wireless network with which the application running in the foreground is communicating, when degradation of the QoE has been detected; making the application running in the foreground communicate with the selected different wireless network.

A wireless communication method by a terminal according to yet another embodiment may include the operations of: identifying information relating to one or more activated wireless connection schemes on the basis of configuration information of the terminal; determining whether to allow each of the one or more activated wireless connection schemes to remain activated on the basis of information relating to a state of the terminal and information relating to the one or more activated wireless connection schemes; and, when one or more wireless connection schemes among the one or more activated wireless connection schemes are identified as being required to be switched to an inactive state, deactivating the identified one or more wireless connection schemes. Information relating to the activated wireless connection schemes may include information relating to at least one wireless network which can wirelessly communicate with the terminal.

Various embodiments can perform wireless communication by selecting a wireless network for communicating therewith on the basis of power consumption, thereby allowing an apparatus to greatly increase power consumption efficiency thereof.

Further, various embodiments can perform wireless communication by selecting a wireless network for communicating therewith on the basis of quality of experience of a user, thereby greatly increasing the quality of experience of the user.

Effects of the present disclosure are not limited to the effects described above. In addition, potential effects expected by a technical feature of the present disclosure may be clearly understood from the following descriptions.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of the present disclosure will be more apparent from the following detailed description taken in conjunction with the accompanying drawings, in which:

FIG. 3 is a view illustrating mapping information according to an embodiment;

FIG. 4 is a view illustrating mapping information according to an embodiment;

DETAILED DESCRIPTION OF THE PRESENT DISCLOSURE

Figure 1:
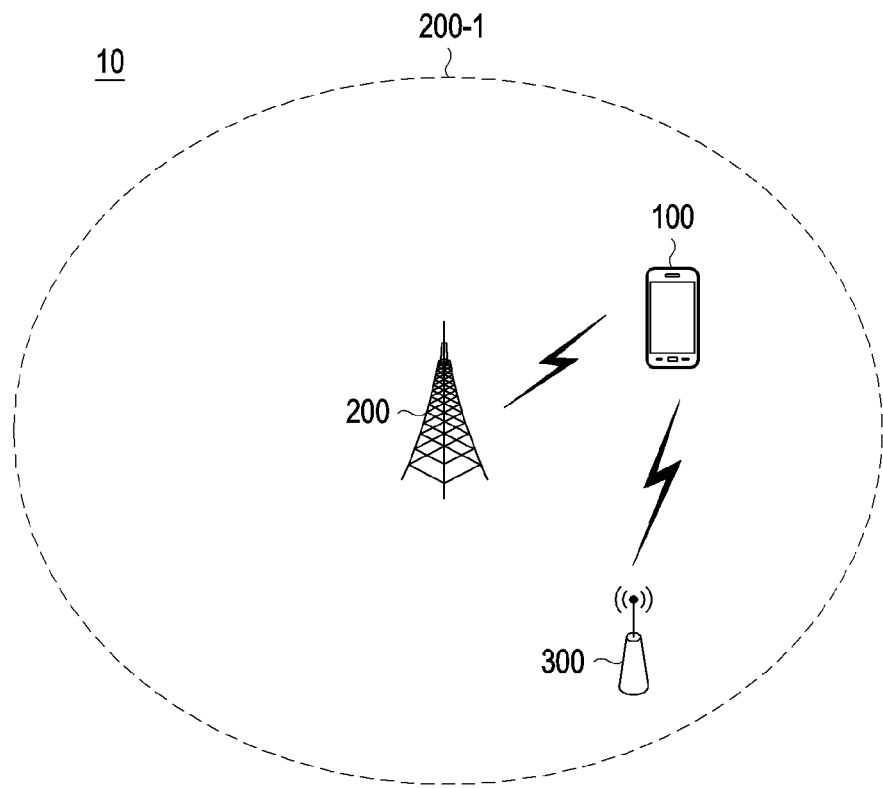
FIG. 1 illustrates a view describing a wireless network according to the present disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments will be described with reference to the accompanying drawings. However, it should be understood that there is no intent to limit the present disclosure to the particular forms disclosed herein; rather, the present disclosure should be construed to cover various modifications, equivalents, and/or alternatives of embodiments. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" may include (1) at least one A, (2) at least one B, or (3) both at least one A and at least one B.

The expression "a first", "a second", "the first", or "the second" used in various embodiments may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. In contrast, it may be understood that when an element (e.g., first element) is referred to as being "directly connected," or "directly coupled" to another element (second element), there is no element (e.g., third element) interposed between them.

As used herein, the expression "configured to" may be interchangeably used with the expression "suitable for", "having the capability to", "designed to", "adapted to", "made to", or "capable of". The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

The terms used in the present disclosure are only used to describe specific embodiments, and are not intended to limit the present disclosure. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments.

Hereinafter, various embodiments will be described in detail with reference to the drawings.

FIG. 1 illustrates a view describing a wireless network according to the present disclosure.

Referring to FIG. 1, a terminal 100 may communicate with a base station 200, a femto base station 300, or both.

The terminal 100 may be variously named a terminal, a Mobile Station (MS), User Equipment (UE), etc. A terminal 100 according to an embodiment may a predetermined electronic device including a wireless communication means. For example, the terminal 100 may be a digital camera, a smart phone, a mobile phone, a game machine, a display device, a head-up display unit for a vehicle, a notebook computer, a laptop computer, a tablet computer, a Personal Media Player (PMP), a Personal Digital Assistant (PDA), a navigation device, an Appcessory device, a wearable device or the like.

A base station 200 may be variously named an eNB, a Base Station (BS), an Access Point (AP), etc., and may supervise a macrocell 200-1. In this case, a macro base station may be an Enhanced Node B (eNB), but is not limited thereto.

A femto base station (micro-BS or pico base station) is a small cellular base station connected to a broadband router, and may play a role in connecting not only conventional 2G but also 3G voice and data to a backbone network of a mobile communication company through a Digital Subscriber Link (DSL), etc.

Although a single base station 200 and a single femto base station 300 are illustrated, there may be multiple base stations and multiple femto base stations.

The example of FIG. 1 described above is merely one among various examples of a wireless network according to the present disclosure, and the present disclosure is not limited thereto. According to various embodiments, the terminal 100 may communicate with an Access Point (AP) which supports various wireless communication technologies.

The wireless communication technologies may be Global System for Mobile communications (GSM), Code-Division Multiple Access (CDMA), Wideband CDMA (WCDMA), Wireless LAN (WLAN) (Wi-Fi), Wireless Broadband (Wibro), World Interoperability for Microwave Access (Wimax), High Speed Downlink Packet Access (HSDPA), Long Term Evolution (LTE), Bluetooth x.x, Zigbee, Ultra-Wide Band (UWB), Personal Space Communication (PSC), Infrared Data Association (IrDA), Wi-Fi Direct communication, Near Field Communication (NFC), etc. but is not limited thereto.

Figure 2:
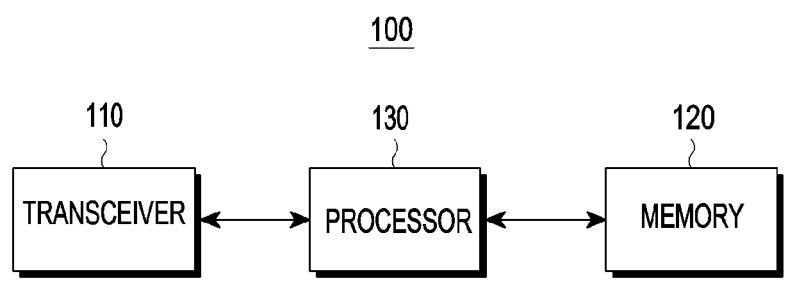
FIG. 2 illustrates a block diagram of a terminal according to the present disclosure.

FIG. 2 illustrates a block diagram of a terminal according to the present disclosure.

Referring to FIG. 2, a terminal 100 may include a transceiver 110, a memory 120, and a processor 130.

The transceiver 110 communicates with at least one wireless network. The transceiver 110 may measure a strength of a signal received from at least one wireless network. Such measurement of a signal strength may be performed under control of the processor 130. For example, the strength of a signal may be a strength of an electric field generated from at least one wireless network.

The memory 120 may store data. Particularly, the memory 120 may store data used to operate the terminal 100.

Various embodiments according to the present disclosure will be described hereinafter. The present disclosure relates to a method and apparatus configured to perform wireless communication and may relate to a method and apparatus configured to select a wireless network with which a terminal is to communicate, on the basis of a pre-configured criterion.

An embodiment relates to a method and apparatus configured to select a wireless network for communicating therewith on the basis of power consumption of a terminal, thereby enabling great improvement of power efficiency thereof.

According to the present embodiment, a memory 120 may store information which a processor 130 to be described later uses to determine a type of wireless network. The information used to determine a type of wireless network may be mapping information between pieces of predetermined information.

Specifically, the mapping information may include a type of multiple wireless networks, a strength of each of signals received from the multiple wireless networks, respectively, and power consumption of the terminal 100. Various examples of the mapping information will be described with reference to FIGS. 3 to 5 hereinafter.

FIG. 3 is a view illustrating mapping information according to an embodiment.

The mapping information 301 in FIG. 3 may take the form of a table. The mapping information 301 may include information relating to types of wireless network (for example, Wi-Fi, 3G, and 4G), signal strengths, and power consumption. The information relating to power consumption may be pre-configured on the basis of the types of wireless network and the signal strengths.

As an example, referring to FIG. 3, when a type of wireless network is Wi-Fi and a signal strength is "Strong", power consumption of the terminal 100 may be "a". As another example, when a type of wireless network is 3G and a signal strength is "Fair", power consumption of the terminal 100 may be "e". As yet another example, when a type of wireless network is 4G and a signal strength is "Weak", power consumption of the terminal 100 may be "i". Similarly, reference signs, "b", "c", "d", "f", "g", and "h", in FIG. 3 also briefly denote power consumption classified according to the types of wireless network and the signal strengths.

"Strong", "Fair", and "Weak", each of which denotes a signal strength, may be pre-configured as certain ranges. In the present specification, three ranges, which are "Strong", "Fair", and "Weak", will be exemplified to describe the ranges of a signal strength. However, the three ranges are provided as an example. Depending on a network situation, the number of the ranges and a criterion for classifying the range may be configured by various schemes. As an example, when a type of wireless network is Wi-Fi, a pre-configured range of the "Strong" signal strength may be configured to be greater than or equal to −30 dBm, a pre-configured range of the "Fair" signal strength may be configured to be smaller than −30 dBm and greater than or equal to −65 dBm, and a pre-configured range of the "Weak" signal strength may be configured to be smaller than −65 dBm. As another example, when a type of wireless network is 3G, a pre-configured range of the "Strong" signal strength may be configured to be greater than or equal to −70 dBm, a pre-configured range of the "Fair" signal strength may be configured to be smaller than −70 dBm and greater than or equal to −85 dBm, and a pre-configured range of the "Weak" signal strength may be configured to be smaller than −85 dBm. As yet another example, when a type of wireless network is 4G, a pre-configured range of the "Strong" signal strength may be configured to be greater than or equal to −90 dBm, a pre-configured range of the "Fair" signal strength may be configured to be smaller than −70 dBm and greater than or equal to −85 dBm, and a pre-configured range of the "Weak" signal strength may be configured to be smaller than −85 dBm. In the following embodiments, when a signal strength is any one of "Strong", "Fair", and "Weak", it may signify that the signal strength is within the ranges described above.

FIG. 4 is a view illustrating mapping information according to an embodiment.

The mapping information 401 in FIG. 4 may take the form obtained by adding information relating to a terminal state to the mapping information 301 in FIG. 3. The information relating to a terminal state may include information relating to an Active state in which data transmission or reception is performed (for example, a state of transmission or reception of data), information relating to an Idle state, information relating to a Transition state between the Active state and the Idle state (for example, a radio tail state), and the like.

As an example, referring to FIG. 4, power consumption of the terminal 100 may be "j" when a type of wireless network is Wi-Fi, a signal strength is "Strong", and a terminal state is the Active state. As another example, power consumption of the terminal 100 may be "w" when a type of wireless network is 3G, a signal strength is "Fair", and a terminal state is the Transition state. As yet another example, power consumption of the terminal 100 may be "jj" when a type of wireless network is 4G, a signal strength is "Weak", and a terminal state is the Idle state. Similarly, reference signs, "k", "l", "m", "n", "o", "p", "q", "r", "s", "t", "u", "v" "y", "z", "aa", "bb", "cc", "dd", "ee", "ff", "gg", "hh", and "ii", in FIG. 4 also briefly denote power consumption classified according to the types of wireless network, the terminal states, and the signal strengths.

Meanwhile, the mapping information 301 and 401 may be updated. In this case, initial mapping information (or an initial value) may be provided from a framework or an operating system of a terminal 100.

Figures 5, 6:
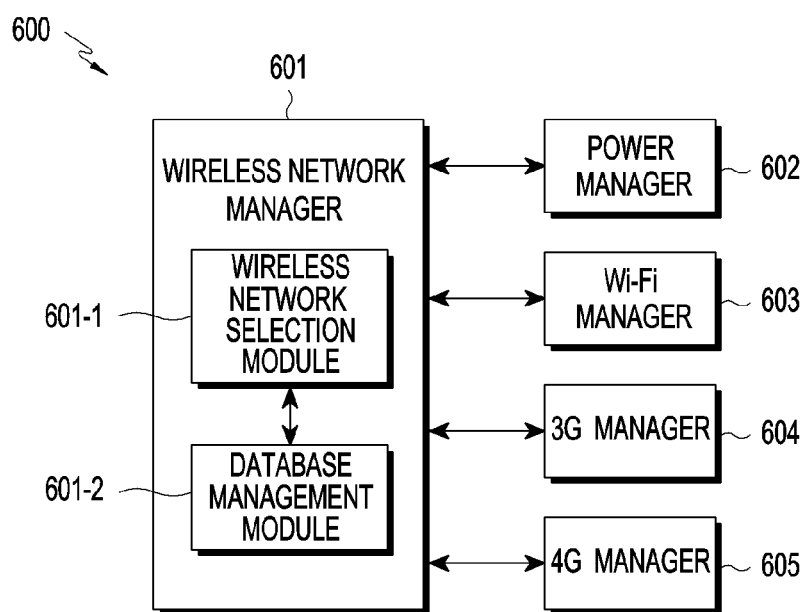
FIG. 5 is a view illustrating initial mapping information according to an embodiment.
FIG. 6 is a block diagram representing a framework of a terminal according to an embodiment.

FIG. 5 is a view illustrating initial mapping information according to an embodiment.

Referring to FIG. 5, the initial mapping information 501 includes information relating to a type of wireless network, a terminal state, and power consumption. As an example, when a type of wireless network is Wi-Fi and a terminal state is the Transition state, power consumption may be "11".

In the example described above, the information relating to power consumption may be electric power information provided as the watt unit or electric current information provided as the ampere unit.

Meanwhile, referring back to FIG. 2, the processor 130 generally controls the terminal 100. Specifically, the terminal may control various features that are not illustrated in FIG. 2, as well as the transceiver 110 and the memory 120.

The processor 130 may select a wireless network among multiple wireless networks.

Specifically, the processor 130 may control the transceiver 110 to receive a signal transmitted from each of the multiple wireless networks. In this case, the processor 130 may determine a strength of each of signals received from the multiple wireless networks, respectively. In addition, the processor 130 may select a wireless network among the multiple wireless networks on the basis of the determined strength of each of the signals and mapping information stored in the memory 120.

Specifically, on the basis of the mapping information, the processor 130 may determine multiple levels of power consumption corresponding to strengths of current signals received from the multiple wireless networks, respectively, and select a wireless network corresponding to a minimum value among the multiple levels of power consumption.

As an example, the processor 130 may determine a signal strength from Wi-Fi as "Strong", determine a signal strength from 3G as "Fair", and determine a signal strength from 4G as "Weak". In this case, referring to the mapping table of FIG. 3, the processor 130 may determine, as "a", power consumption of a case where a signal strength of Wi-Fi is "Strong", determine, as "e", power consumption of a case where a signal strength of 3G is "Fair", and determine, as "i", power consumption of a case where a signal strength of 4G is "Weak". On the assumption that "a" is the smallest value among "a", "e", and "i", the processor 130 may select the Wi-Fi wireless network among the wireless networks. That is, the processor 130 may communicate with the selected Wi-Fi wireless network.

As another example, the processor 130 may select a wireless network among multiple wireless networks on the basis of a strength of each of current signals received from the multiple wireless networks, respectively, mapping information, and a current operation state of the terminal 100.

Specifically, the processor 130 may determine a signal strength from Wi-Fi as "Strong", determine a signal strength from 3G as "Fair", determine a signal strength from 4G as "Weak", and determine a current state of the terminal 100 as the Active state. In this case, referring to the mapping table of FIG. 4, the processor 130 may determine, as "j", power consumption of a case where a signal strength of Wi-Fi is "Strong" and a terminal state is the Active state, determine, as "v", power consumption of a case where a signal strength of 3G is "Fair" and a terminal state is the Active state, and determine, as "hh", power consumption of a case where a signal strength of 4G is "Weak" and a terminal state is the Active state. On the assumption that "hh" is the smallest value among "j", "v", and "hh", the processor 130 may select the 4G wireless network among the wireless networks. That is, the processor 130 may communicate with the selected 4G wireless network.

On the other hand, power consumption of the terminal 100 is relatively low when a signal strength received from a wireless network is strong, while power consumption of the terminal 100 is relatively high when a signal strength received from the wireless network is weak. In order to reflect this point, in the examples described above, when the processor 130 determines multiple levels of power consumption corresponding to signal strengths received from the multiple wireless networks, respectively, the processor 130 may attach a weight on the basis of strengths of current signals received from the multiple wireless networks to decide the multiple levels of power consumption. As an example, when a signal strength received from a Wi-Fi wireless network is "Strong", the processor 130 may attach a low weight (e.g. 0.9) to power consumption of the mapping information corresponding to the signal strength. As another example, when a signal strength received from a 4G wireless network is "Weak", the processor 130 may attach a high weight (e.g. 1.1) to power consumption of the mapping information corresponding to the signal strength. The processor 130 may select a wireless network among the multiple wireless networks on the basis of power consumption values obtained by attaching the weights.

The processor 130 may update mapping information 301, 401, and 501, for example. That is, the processor 130 may update, to the mapping information, power consumption of a case where communication with a selected wireless network in the example described above is performed.

As an example, it is assumed that the initial mapping information 501 of FIG. 5 is provided. In this case, the processor 130 may determine a terminal state. When a determination result indicates that the terminal state is the Active state, the processor 130 uses the initial mapping information 501 to determine a smallest value of power consumption among power consumption "kk" indicated when Wi-Fi and the Active state are configured, power consumption "nn" indicated when 3G and the Active state are configured, and power consumption "qq" indicated when 4G and the Active state are configured. When a determination result indicates that the smallest value of power consumption is "kk", the processor 130 communicates with a Wi-Fi wireless network. During communication with the Wi-Fi wireless network or after the communication has been terminated, the processor 130 may measure actual power consumption of a case where the Wi-Fi wireless network is used in the Active state of the terminal 100. In this case, the processor 130 may update the initial mapping information 501 with the measured actual power consumption. For example, the processor 130 may replace "kk" of the initial mapping information 501 with the measured actual power consumption.

As another example, the processor 130 may update the mapping information 401 in FIG. 4. It is assumed that the terminal 100 is connected to a 3G wireless network while in the Transition state. In this case, the processor 130 may determine power consumption and a signal strength received from the 3G wireless network. The processor 130 may update the mapping information 401 with at least one of the received signal strength and the power consumption.

Meanwhile, the processor 130 may perform the wireless network selection process or the mapping information update process described above according to a predetermined event. As an example, the processor 130 may perform the wireless network selection process or the mapping information update process described above when at least one event among a case where a strength of a signal received from a wireless network configured to communicate with the terminal 100 is changed outside a pre-configured range occurs, a case where a predefined application is activated, and a case where a communication request is received from a predefined application. In the case of activation and the case of performance of a communication request, the one or more predefined applications may be configured to be the same or different from each other.

According to the embodiments described above, the processor 130 may efficiently control power consumption of the terminal 100 in a state in which available power of the terminal 100 is limited.

FIG. 6 is a block diagram representing a framework of a terminal according to an embodiment.

Referring to FIG. 6, a framework 600 may include at least one of a wireless network manager 601, a power manager 602, a Wi-Fi manager 603, a 3G manager 604, and a 4G manager 605. The framework 600 may be implemented as software operated by at least one processor. As another embodiment, at least one of functional blocks of the framework 600 also may be implemented as hardware or a combination of hardware and software. In addition, the processor 130 in FIG. 2 or the processor 840 in FIG. 8 to be described later may control an entire apparatus such that at least one of functions of the framework 600 is performed.

A wireless network manager 601 may include at least one of a wireless network selection module 601-1 and a database management module 601-2.

The wireless network selection module 601-1 may determine power consumption corresponding to each of multiple wireless networks by using mapping information provided by the database management module 601-2. On the basis of a power consumption determination result, the wireless network selection module 601-1 may select a wireless network for connection and make a switch to the selected wireless network. Further, the wireless network selection module 601-1 may perform a wireless network selection process by an event input by a user. The wireless network selection module 601-1 may control a display to display power information received from the power manager 602 after making the switch to the selected wireless network.

The database management module 601-2 may store and update mapping information. For example, the database management module 601-2 may update the mapping information with power consumption information received from the power manager 602. Further, the database management module 601-2 may monitor at least one wireless network state. For example, the database management module 601-2 may map a signal strength received from the Wi-Fi manager 603, 3G manager 604, and 4G manager 605 onto at least one of a type of wireless network, a terminal state, and power consumption.

The power manager 602 may measure, in real time or periodically, power consumption according to a current state of the terminal 100.

The Wi-Fi manager 603, the 3G manager 604, and the 4G manager 605 may measure, in real time or periodically, a signal strength received from corresponding wireless networks.

Figure 7:
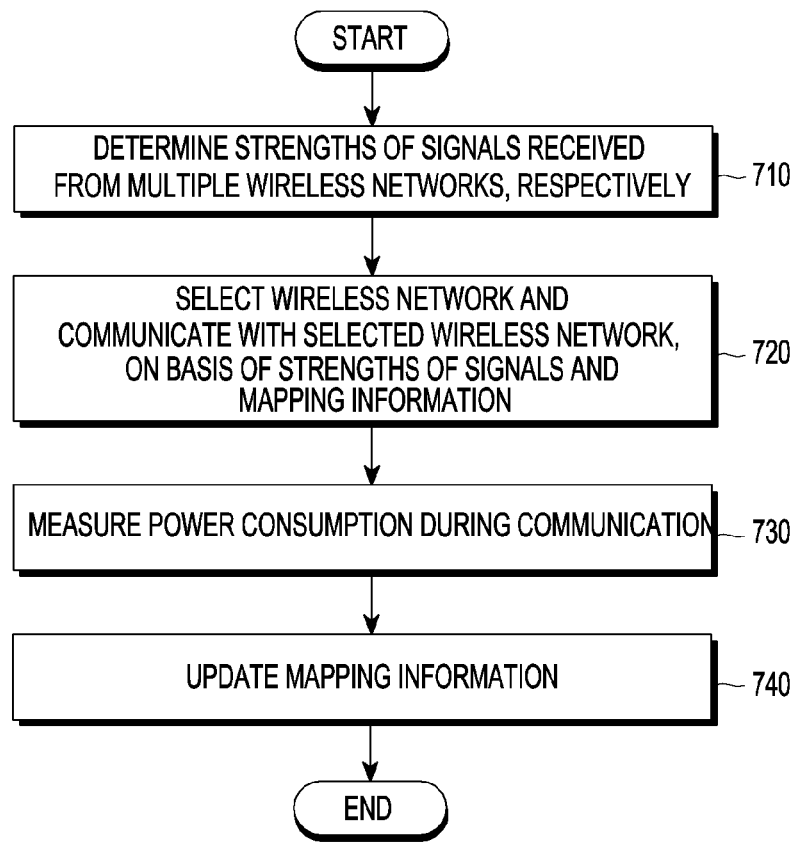
FIG. 7 is a flowchart illustrating a wireless communication method according to an embodiment.

FIG. 7 is a flowchart illustrating a wireless network selection method according to an embodiment.

According to FIG. 7, the processor 130 may determine strengths of signals received from multiple wireless networks, respectively (710). The processor 130 may select a wireless network and communicate with the selected wireless network, on the basis of the determined strengths of the signals and mapping information (720). The processor 130 may measure power consumption of the terminal 100 during communication (730). The processor 130 may update the mapping information with the measured power consumption (740).

Figure 8:
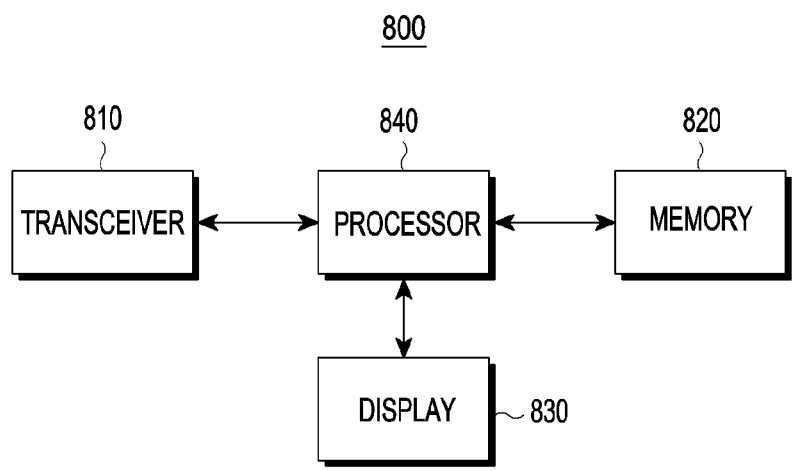
FIG. 8 illustrates a block diagram of a terminal according to an embodiment.

FIG. 8 illustrates a block diagram of a terminal according to an embodiment.

Referring to FIG. 8, a terminal 800 includes a transceiver 810, a memory 820, a display 830, and a processor 840. Repetitive descriptions with respect of the terminal 100 described above will be hereinafter omitted. The processor 840 may perform the same control as that of the processor 130 of FIG. 2. As another embodiment, the display 830 may be omitted in a case of a terminal in which the display 830 is not required.

The display 830 displays various screens. For example, the display 830 may display a Graphic User Interface (GUI) provided by the processor 840.

The processor 840 may receive a user command input thereto in order to trigger an operation of selecting a wireless network among the multiple wireless networks described above. Specifically, the processor 840 may display the GUI in order to receive the user command that triggers the operation of selecting a wireless network among the multiple wireless networks. For example, an operation of selecting a wireless network among multiple wireless networks may be defined as an adaptive network selection mode. The following embodiment will be described on the basis of this definition.

According to an embodiment, a processor 840 may operate in the adaptive network selection mode. The adaptive network selection mode may be a mode in which, at the time of network selection, a network that can minimize terminal battery consumption is selected according to a network environment. For example, when the adaptive network selection mode is configured, the processor 840 may select a wireless network among multiple wireless networks on the basis of a strength of each of current signals received from the multiple wireless networks, respectively, and the mapping information described above.

In addition, the processor 840 may produce a Graphic User Interface (GUI) for turning on the adaptive network selection mode of the terminal 800 and display the GUI. For example, when an event in which the GUI for turning on the adaptive network selection mode is touched occurs on the display 830, the processor 840 may perform the wireless network selection process and/or the mapping information update process according to an embodiment described above.

Figure 9:
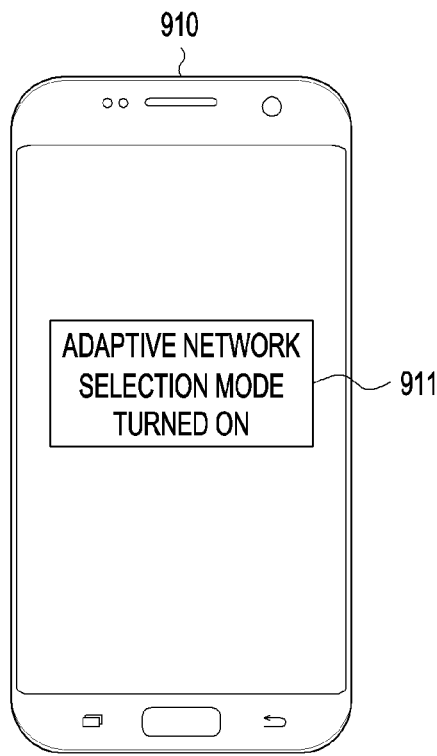
FIG. 9 illustrates a view describing a display of a GUI according to an embodiment.

For example, referring to FIG. 9, the processor 840 may produce a GUI 911 including "Adaptive network selection mode turned on" and display the GUI on the display 910.

In addition, the processor 840 may display a GUI including information relating to power consumption of a case where communication with a selected wireless network is performed.

Figure 10:
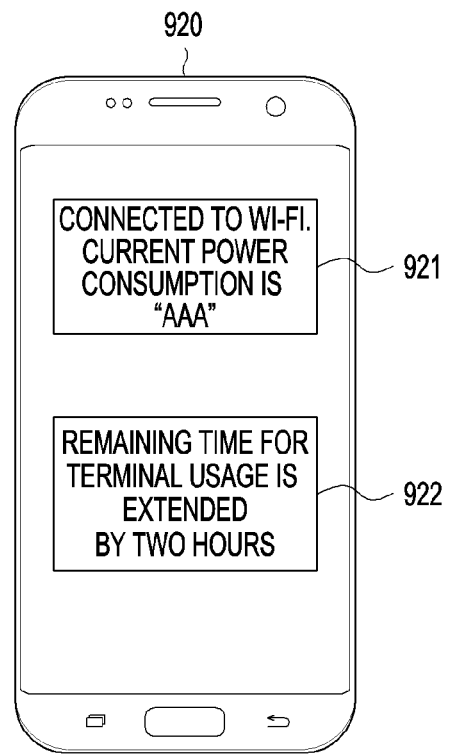
FIG. 10 illustrates a view describing a display of a GUI according to an embodiment.

For example, referring to FIG. 10, the processor 840 may display the GUI 921 including "Connected to Wi-Fi, current power consumption is aaa (W)" and the GUI 922 including "Remaining time for terminal usage is extended by two hours" on the display 920.

Figure 11:
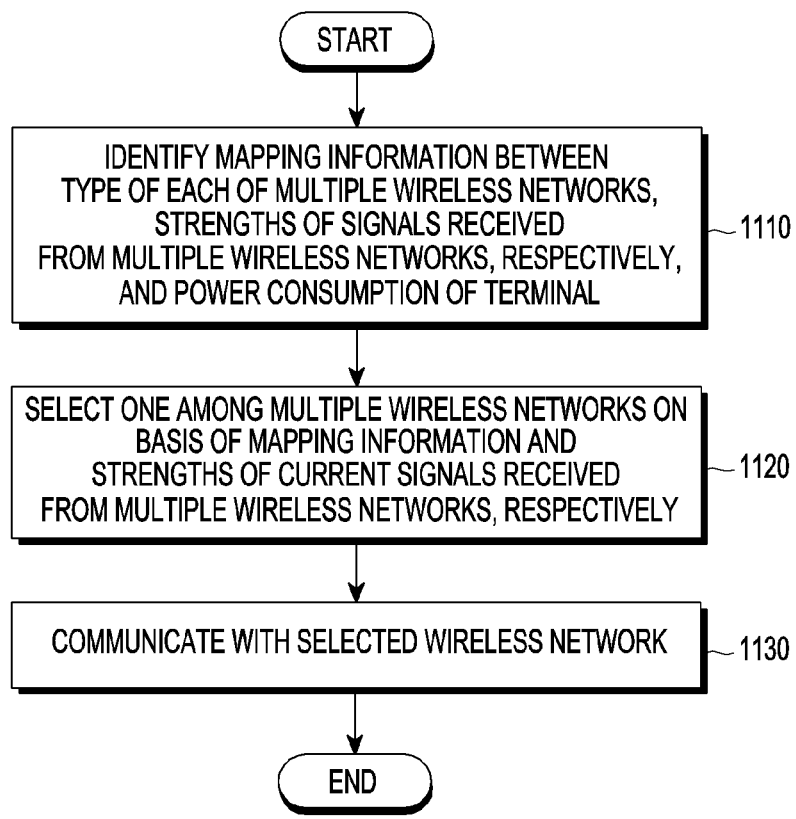
FIG. 11 is a flowchart illustrating a wireless communication method according to an embodiment.

FIG. 11 is a flowchart illustrating a wireless communication method according to an embodiment.

Referring to FIG. 11, a wireless communication method by a terminal according to the present embodiment may include the operations of: identifying mapping information between a type of each of multiple wireless networks, a strength of each of signals received from the multiple wireless networks, respectively, and power consumption of the terminal (1110); selecting one wireless network among the multiple wireless networks on the basis of the mapping information and the strength of each of current signals received from the multiple wireless networks, respectively (1120); and communicating with the selected wireless network (1130).

The mapping information may be information stored in a memory in advance by the processor 840, and initial mapping information may be stored in the memory in advance. The processor 840 may identify the mapping information to determine the strength of each of signals received from the multiple wireless networks, respectively. Further, on the basis of a determination result, the processor 840 may determine multiple levels of power consumption corresponding to strengths of current signals received from the multiple wireless networks, respectively, and select a wireless network corresponding to a minimum value among the multiple levels of power consumption.

The mapping information may further include information relating to operation state information of the terminal. The operation of selecting may include an operation of selecting a wireless network among multiple wireless networks on the basis of the strength of each of current signals received from the multiple wireless networks, the mapping information, and the current operation state of the terminal.

In this case, the operation state of the terminal may be one state among an active state where data transmission or reception is performed, an idle state, and a transition state between the active state and the idle state.

In addition, the wireless communication method by the terminal may further include updating the mapping information with power consumption of a case where communication with the selected wireless network is performed.

The selecting described above may be triggered by at least one among a case where a strength of a signal received from a wireless network configured to communicate with the terminal is changed outside a pre-configured range, a case where a predefined application is activated, and a case where a communication request is received from a predefined application.

In this case, on the basis of the mapping information, the selecting may include determining multiple levels of power consumption corresponding to strengths of current signals received from the multiple wireless networks, respectively, and selecting a wireless network corresponding to a minimum value among the multiple levels of power consumption.

The multiple levels of power consumption may be obtained by attaching weights corresponding to strengths of current signals received from the multiple wireless networks, respectively.

In addition, the wireless communication method by the terminal may further include displaying a Graphic User Interface (GUI) including information relating to power consumption of a case where communication with the selected wireless network is performed.

In addition, the wireless communication method by the terminal may further include displaying a GUI for turning on the adaptive network selection mode of the terminal.

An embodiment relates to a method and apparatus configured to perform wireless communication by selecting a wireless network according to Quality of Experience (QoE) of a user, thereby enabling maximization of the QoE of the user.

A structure of a wireless network according to the present embodiment may be the same structure as the structure of the wireless network described above with reference to FIG. 1, and the detailed description thereof will be omitted. A structure of a terminal according to the present embodiment may be the same structure as the structure of the terminal 800 described above with reference to FIG. 8, and the detailed description thereof will be omitted. In a description of the present embodiment, operation of an application may be understood as operation of a processor which controls the operation of the application.

Figure 12:
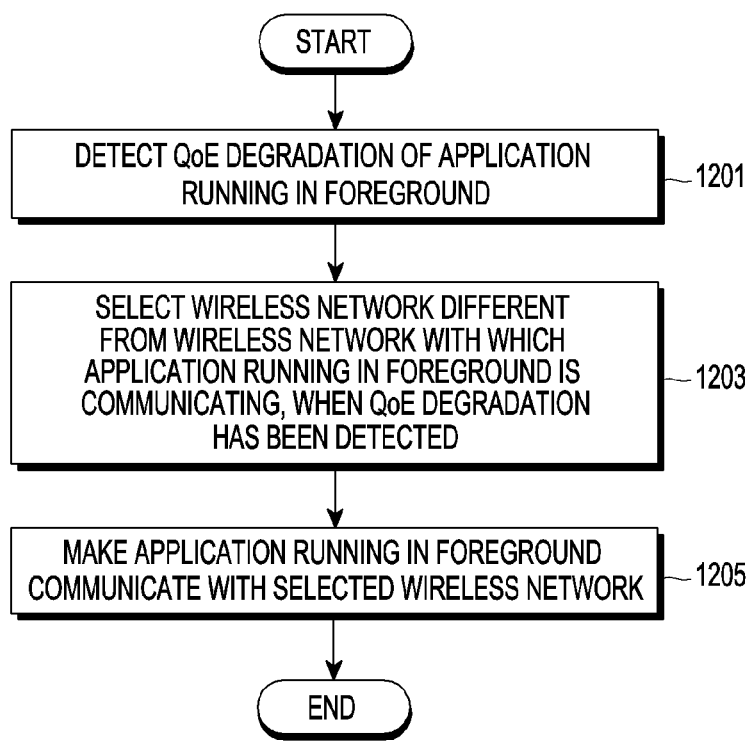
FIG. 12 is a flowchart illustrating a wireless communication method according to an embodiment.

FIG. 12 is a flowchart illustrating a wireless communication method by a terminal according to an embodiment.

Referring to FIG. 12, the wireless communication method by the terminal 800 according to the present embodiment may include: detecting degradation of Quality of Experience of an application which is running in the foreground (1201); selecting, among multiple wireless networks, one wireless network different from a wireless network with which the application running in the foreground is communicating, when degradation of the Quality of Experience has been detected (1203); and making the application running in the foreground communicate with the selected one wireless network (1205).

The user QoE may be defined as an allowance of an application or service that a service user recognizes. The user QoE may be influenced by a state of a wireless network to which an application running in the foreground is connected. For example, when a type of a wireless network with which an application running in the foreground is communicating is Wi-Fi and a signal strength received through Wi-Fi is "Weak", the user QoE may be degraded.

Meanwhile, the user QoE may be influenced by a kind of an application running in the foreground. That is, even when signal strengths received from wireless networks are the same, the user QoE may be different depending on the kind of an application running in the foreground. For example, since an application providing a text-based content (e.g. an Internet browser application) has a low data transfer rate per unit hour, the user QoE above a certain level may be maintained even when a signal strength received from a wireless network is lower than a predetermined threshold value. On the other hand, since an application providing a multimedia-based content (e.g. video streaming application) has a high data transfer rate per unit hour, a signal strength received from a wireless network may be higher than a predetermined threshold value to maintain the user QoE above a certain level.

In the present embodiment, degradation of QoE may be detected by detecting whether the number of occurrences of a predetermined event for a predetermined time is more than a threshold number of times. A QoE degradation detection operation according to the present embodiment will be described hereinafter.

Figure 13A:
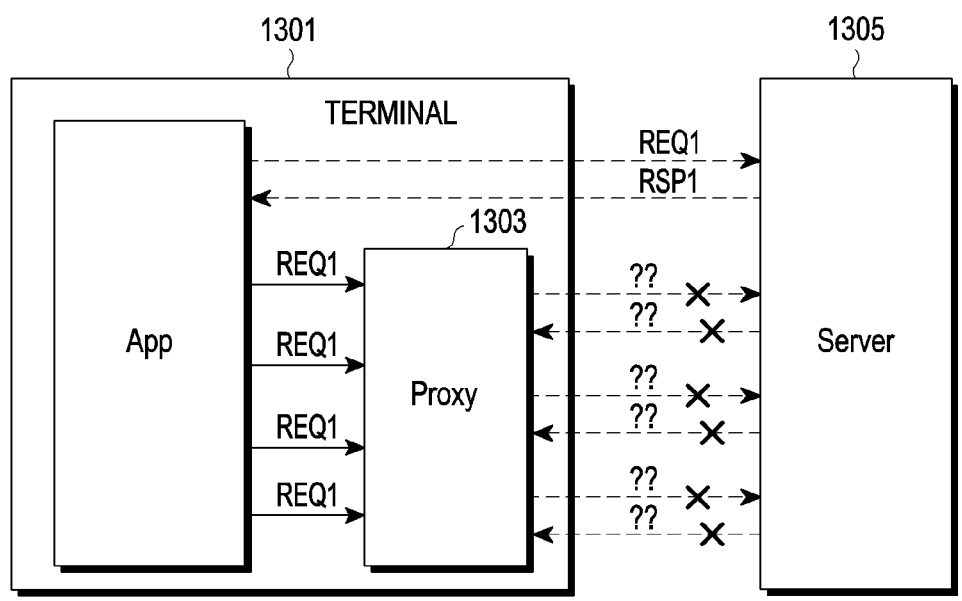
FIGS. 13A to 13C is a view illustrating an operation of detecting degradation of quality of experience according to an embodiment.
Figure 13B:
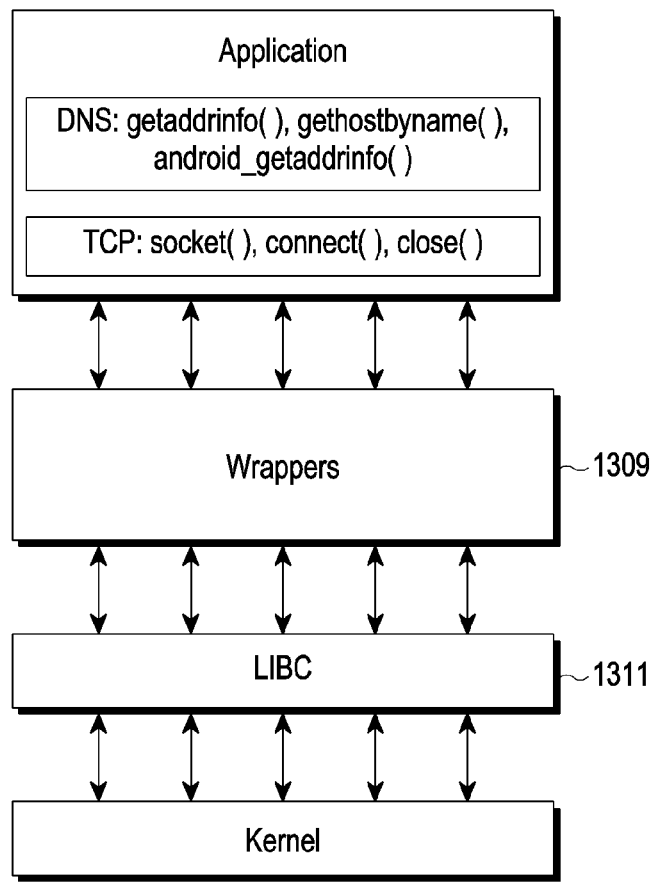
Figure 13C:

FIGS. 13A to 13C are views illustrating an operation of detecting degradation of QoE according to an embodiment.

FIG. 13A is a view illustrating a method for detecting QoE degradation by installing a proxy 1303 in an application layer 1301 of a terminal.

The proxy 1303 may be implemented as software operating in the processor 840. The proxy 1303 may be installed in the application layer 1301 of the terminal 800 to detect an application request of an application running in the foreground. For example, the proxy 1303 may detect whether an application running in the foreground makes a data request to a server 1305. A detection result of the proxy 1303 may be transmitted to the processor 840 in the terminal 800. The processor 840 may determine whether the QoE has been degraded, from the detection result of the proxy 1303. That is, when a signal strength of a wireless network to which an application running in the foreground is connected is low, an application may not receive data from a server 1305 even if the application requests the data from the server 1305. For this reason, the same data requests are repeatedly made. The processor 840 may detect whether such the same data requests have been made to detect whether the QoE has been degraded. For example, when the same data requests of the application running in the foreground are made as many as $N_1$ times or more to the server 1305 for a predetermined time $T_1$, the processor 840 may determine that the QoE has been degraded.

As a more detailed example, it is assumed that an application running in the foreground is an Internet browser application. The Internet browser application may generate a data request for each object configuring a web browser screen, for example, for each text, image, and thumbnail, and transmit the data request. When data requests for the same object from the Internet browser application are made as many as $N_1$ times or more to the server 1305 for a predetermined time $T_1$, the processor 840 may determine that the QoE has been degraded.

Meanwhile, as hereinafter described, a wireless communication method by terminal 800 according to an embodiment may further include an operation of comparing a pre-configured threshold value and a signal strength received from a wireless network with which an application running in the foreground is communicating. If this operation is included, the proxy 1303 may be one that is installed when a signal strength received from a wireless network with which an application running in the foreground is communicating is smaller than the threshold value. That is, when a signal strength received from a wireless network with which an application running in the foreground is communicating is greater than or equal to the threshold value, wireless communication between the application running in the foreground and the server may be performed without the proxy 1303. When a signal strength received from a wireless network with which an application running in the foreground is communicating is smaller than the threshold value, the proxy 1303 is installed to perform the QoE degradation detection method described above.

FIG. 13B is a view illustrating a method for detecting QoE degradation by installing a wrapper 1309 in a framework 1307 of a terminal.

A kernel, as a part of an operating system of a terminal, may signify software for providing basic services for all the other parts of the operating system. For example, the kernel may be software which distributes hardware resources of the terminal among processes requiring for the resources, and performs process control, memory control, etc.

An LIBC layer 1311 is a standard C library layer and may be a layer including a library of standard functions available for an application.

The wrapper 1309 may be implemented as software operating in the processor 840. The wrapper 1309 may be installed in the framework 1307 of the terminal 800 to detect an application request of an application running in the foreground. For example, the wrapper 1309 may detect whether an application running in the foreground makes an API request to a LIBC 1311. Specifically, the wrapper 1309 may collect a DNS query transmitted from an application running in the foreground, related TCP socket information (for example, an IP address or a port number), etc. A detection result of the wrapper 1309 may be transmitted to the processor 840 in the terminal 800. The processor 840 may determine whether the QoE has been degraded, from the detection result of the wrapper 1309. For example, when the same data requests of the application running in the foreground are made as many as $N_2$ times or more to the LIBC layer 1311 for a predetermined time $T_2$, the processor 840 may determine that the QoE has been degraded. FIG. 13C is a view illustrating a method for detecting QoE degradation by detecting whether the same inputs are received from an input device. For example, when the processor 840 in the terminal 800 receives the same inputs as many as $N_3$ or more for a predetermined time $T_3$ from an input device (not shown) in the terminal 800, the processor may determine that the QoE has been degraded. When the input device is a touch screen, the processor 840 may determine input coordinates within a predetermined range as the same inputs. The radius, position, etc. of the predetermined range may be configured differently depending on the kind of an application running in the foreground.

As a more detailed example, it is assumed that an application running in the foreground is an Internet browser application. A user who uses an Internet browser application may repeatedly click on a refresh button in the Internet browser application when QoE degradation has occurred due to the Internet slowed down. In this case, coordinates within a predetermined range are repeatedly input through the touch screen, and the processor 840 may regard these inputs as the same inputs. The predetermined range may be configured to be an area around the refresh button in the Internet browser application.

As another detailed example, it is assumed that an application running in the foreground is a video streaming application. A user who uses a video streaming application may repeatedly click on a play button in the video streaming application when QoE degradation has occurred due to the Internet slowed down. In this case, coordinates within a predetermined range are repeatedly input through the touch screen, and the processor 840 may regard these inputs as the same inputs. The predetermined range may be configured to be an area around the play button in the video streaming application.

As described above, when such the same inputs are input as many as $N_3$ or more for a predetermined time $T_3$, the processor 840 may determine that the QoE has been degraded.

On the other hand, in the present example, only a case in which the input device is a touch screen is given for an illustration. However, the present disclosure is not limited thereto and the input device may be implemented as various forms, such as a physical button, etc. In addition, the application running in the foreground is not limited to an Internet browser application.

The operations of detecting QoE degradation, described above referring to FIG. 13A to 13C are enumerated to provide examples and the present embodiment is not limited thereto. As another example, a threshold value is configured for each kind of application running in the foreground, and the processor 840 may determine that QoE has been degraded when a signal strength from a wireless network with which an application running in the foreground is wirelessly communicating is smaller than the threshold value.

When the QoE degradation has been detected, the processor 840 may select, among multiple wireless networks, one wireless network different from a wireless network with which the application running in the foreground is communicating (1203). The processor 840 may subsequently make the application running in the foreground perform wireless communication with the selected one wireless network (1205). In this case, a wireless network with which an application running in the foreground is wirelessly communicating and a wireless network with which an application running in the background is wirelessly communicating may be different from each other.

As a more detailed example, it is assumed that an application running in the foreground is a video streaming application, an application running in the background is a messenger application, and both of the applications are wirelessly communicating with a Wi-Fi wireless network. As described above, even when signal strengths received from a wireless network are the same, user QoE may differ depending on kinds of applications. In the present example, under the same Wi-Fi strength, the messenger application may show high user QoE, while the video streaming application may show low user QoE.

When the processor 840 detects QoE degradation of the video streaming application running in the foreground, the processor 840 may select another wireless network other than Wi-Fi, among wireless networks to which the terminal 800 may be connected. For example, the processor 840 may select a 4G wireless network. The processor 840 may subsequently make the video streaming application running in the foreground perform wireless communication with the selected 4G wireless network. In this case, the messenger application running in the background may still perform wireless communication with Wi-Fi. In such a manner, according to an embodiment, a network with which an application running in the foreground is communicating and a network with which an application running in the background may be different from each other. Therefore, an embodiment enables minimization of data consumption amount and maintenance of high QoE.

Meanwhile, the operation of selecting, among multiple wireless networks, one wireless network different from a wireless network with which an application running in the foreground is communicating (1203) may be one that is started when a strength of at least one signal among signals received from the multiple wireless networks is greater than or equal to a pre-configured threshold value. For example, in the example described above, when a signal strength received from the 4G network is smaller than a predetermined threshold value, the processor 840 may not select the 4G network. In this case, the wireless communication network performing wireless communication with the video streaming application may not be changed. The reason is that it is not required to change a wireless network for wireless communication with an application running in the foreground when it is determined that QoE would not be improved even if the wireless network for the wireless communication with the application running in the foreground were changed.

Meanwhile, the operation of making an application running in the foreground perform wireless communication with a selected wireless network (1205) may include an operation of producing a GUI configured to receive a user command to make the application running in the foreground perform wireless communication with the selected wireless network. The produced GUI may be displayed through the display 830. When the user command to change a wireless network with which the application running in the foreground is communicating is input by the produced GUI, the processor 840 may make the application running in the foreground perform wireless communication with the selected wireless network.

In this case, the processor 840 may use a database for storing a user command and, when the same situation occurs afterward, the processor 840 may change a wireless network with which an application running in the foreground is communicating on the basis of the database. That is, the processor 840 may build a database by storing information, in which situation a user switches a wireless network, in the memory 820 and, when the same situation occurs afterward, the processor 840 may automatically switch a wireless network on the basis of the built database.

As a more detailed example, it is assumed that an application running in the foreground is a video streaming application and is connected through Wi-Fi. If a user has switched a Wi-Fi to a 4G wireless network when a Wi-Fi electric field strength of −50 dBm persists for more than five seconds, the processor 840 may store this information in the memory 820 to build a database. The processor 840 may subsequently switch a wireless network with which the video streaming application is to communicate, to a 4G wireless network on the basis of the built database. For example, in a case of determining on the basis of the built database, if it is determined that a user has switched a Wi-Fi to a 4G wireless network by as many as a predetermined frequency number or more (e.g. more than 90%) when an application running in the foreground is the video streaming application and a Wi-Fi electric field strength of −50 dBm persists for more than five seconds, the processor 840 may switch a wireless network with which the video streaming application is to communicate, to a 4G wireless network.

In this case, the processor 840 may produce a GUI configured to receive a user command to permit a wireless network with which an application running in the foreground is communicating, to be automatically changed in the same situation on the basis of the built database, and may display the GUI through the display 830. In this case, the GUI configured to receive the user command input thereto may be produced when the number of wireless network switch selection in the same situation is accumulated to be more than a predetermined frequency number. When a user command permitting a wireless network change is input, the processor 840 may perform a method for changing a wireless network on the basis of the database described above.

On the other hand, as another example, without receiving any user command, the processor 840 may directly make an application running in the foreground perform wireless communication with a selected wireless network.

Meanwhile, a wireless communication method by terminal 800 according to an embodiment may further include an operation of comparing a pre-configured threshold value and a signal strength received from a wireless network with which an application running in the foreground is communicating. In addition, the operation 1201 and the operations thereafter according to an embodiment may be ones that are performed when a signal strength received from a wireless network with which an application running in the foreground is communicating is smaller than the threshold value. For example, when the wireless network is a Wi-Fi network, the threshold value may be given as a Wi-Fi electric field strength. When an electric field strength of Wi-Fi through which an application running in the foreground communicates is smaller than the threshold value, the operation 1201 and the operations thereafter according to an embodiment.

An embodiment relates to a method and apparatus configured to: identify information relating to an activated wireless connection scheme on the basis of wireless network configuration information of the terminal 800; and deactivate a wireless connection scheme activated unnecessarily, thereby enabling great improvement of power efficiency.

A structure of a wireless network according to the present embodiment may be the same structure as the structure of the wireless network described above with reference to FIG. 1, and the detailed description thereof will be omitted. A structure of a terminal according to the present embodiment may be the same structure as the structure of the terminal 800 described above with reference to FIG. 8, and the detailed description thereof will be omitted.

Figure 14:
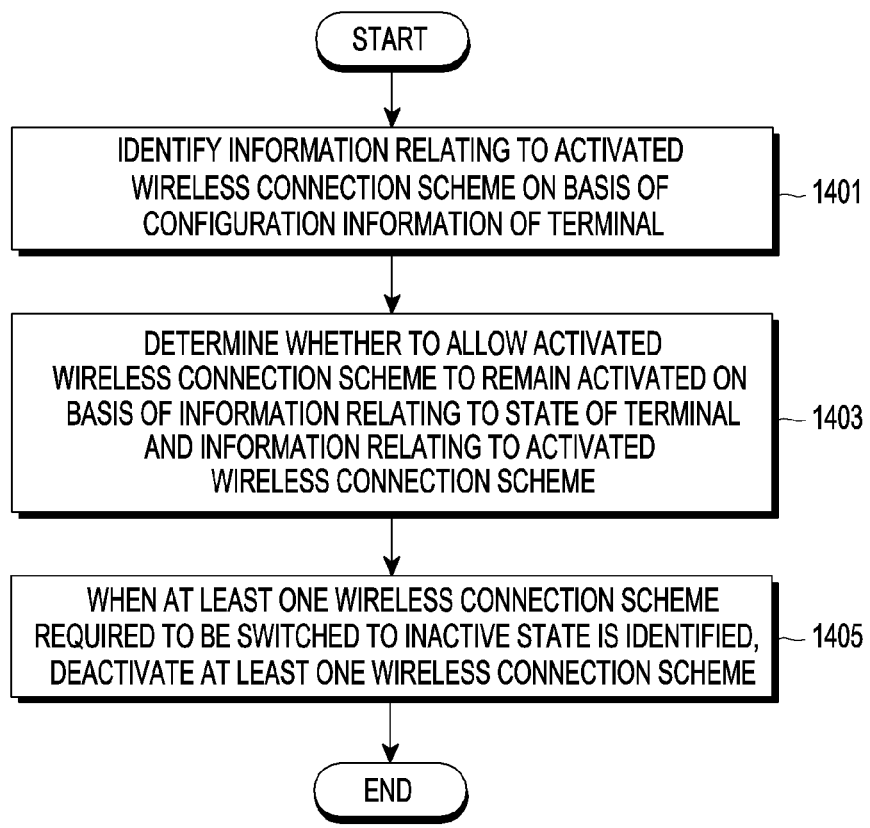
FIG. 14 is a flowchart illustrating a wireless communication method according to an embodiment.

FIG. 14 is a flowchart illustrating a wireless communication method by a terminal according to an embodiment.

Referring to FIG. 14, a wireless communication method by the terminal 800 according to the present embodiment may include the operations of: identifying information relating to an activated wireless connection scheme on the basis of configuration information of the terminal 800 (1401); determining whether to allow the activated wireless connection scheme to remain activated on the basis of information relating to a state of the terminal 800 and the information relating to the activated wireless connection scheme (1403); and, when a determination result indicates that the activated wireless connection scheme is not required to remain activated, deactivating the activated wireless connection scheme (1405).

In the present embodiment, the configuration information of the terminal 800 is configuration information relating to connectivity of the terminal 800, and may include information relating to a wireless connection scheme activated to allow the terminal 800 to establish connection thereto. The information relating to the activated wireless connection scheme may include information relating to at least one wireless network which can wirelessly communicate with the terminal 800. For example, the information relating to activated wireless connection schemes may be information relating to whether Wi-Fi has been turned on to allow the terminal 800 to have connection to a Wi-Fi wireless network, whether Bluetooth has been turned on to allow the terminal 800 to have connection to a Bluetooth wireless network, whether NFC has been turned on to allow the terminal 800 to have connection to an NFC wireless network, whether GPS has been turned on to allow the terminal 800 to have connection to a GPS wireless network, whether Cellular has been turned on to allow the terminal 800 to have connection to a Cellular wireless network, etc. These are enumerated to provide examples and the information relating to activated wireless connection schemes is not limited thereto. The processor 840 may identifying information relating to at least one wireless network configured to allow the terminal 800 to have connection thereto at the moment by identifying the information relating to an activated wireless connection scheme on the basis of the configuration information of the terminal 800 (1401).

The processor 840 may determine whether to allow the activated wireless connection scheme to remain activated on the basis of information relating to a state of the terminal 800 and the information relating to the activated wireless connection scheme (1403). When a determination result indicates that the activated wireless connection scheme is not required to remain activated, that is, when it is determined that the activated wireless connection scheme has been unnecessarily activated, the processor 840 may deactivate the activated wireless connection scheme (1405). The information relating to a state of the terminal 800 may be information which allows determination of whether the terminal 800 is required to have connection to a wireless network configured to allow the terminal 800 to have connection thereto.

As a more detailed example, it is assumed that the terminal 800 is configured to be connectable to a Wi-Fi wireless network. In this case, the terminal 800 cannot be connected to Wi-Fi when there is no Wi-Fi AP around the terminal 800. Therefore, Wi-Fi of the terminal 800 may be one that has been unnecessarily activated. The processor 840 may determine that Wi-Fi of the terminal 800 has been unnecessarily activated from such information relating to the state of the terminal 800, that is, the information that there is no connectable Wi-Fi AP around the terminal 800. The processor 840 may subsequently turn off Wi-Fi determined as having been unnecessarily activated, to deactivate Wi-Fi.

As another detailed example, it is assumed that the terminal 800 is configured to be connectable to a Bluetooth wireless network. In this case, the terminal 800 cannot be connected to Bluetooth when there is no Bluetooth beacon (BT beacon) around the terminal 800. Therefore, Bluetooth of the terminal 800 may be one that has been unnecessarily activated. The processor 840 may determine that Bluetooth of the terminal 800 has been unnecessarily activated from such information relating to the state of the terminal 800, that is, the information that there is no connectable Bluetooth beacon around the terminal 800. The processor 840 may subsequently turn off Bluetooth determined as having been unnecessarily activated, to deactivate Bluetooth.

As yet another detailed example, it is assumed that GPS of the terminal 800 has been activated by a navigation application, etc. In this case, the terminal 800 is not required to be connected to a GPS wireless network of the terminal 800 after the navigation application is closed. Therefore, GPS of the terminal 800 may be one that has been unnecessarily activated. The processor 840 may determine that GPS of the terminal 800 has been unnecessarily activated from such information relating to the state of the terminal 800, that is, from the termination of the navigation application. The processor 840 may subsequently turn off GPS determined as having been unnecessarily activated, to deactivate GPS.

As yet another detailed example, it is assumed that GPS of the terminal 800 has been activated, but the terminal 800 is in a state of standing still without moving. The processor 840 may identify a state of the terminal 800 standing still from a value sensed by a sensor (not shown) in the terminal 800. Alternatively, the processor 840 may identify a state of the terminal 800 standing still as a user of the terminal 800 is sleeping, from a sleep alarm. When the terminal 800 is in the state of standing still, GPS coordinate values are hardly likely to be changed. Therefore, the processor 840 may determine that GPS of the terminal 800 has been unnecessarily activated. That is, the processor 840 may determine that GPS of the terminal 800 has been unnecessarily activated from such information relating to the state of the terminal 800, that is, from the state of the terminal 800 standing still at the moment. The processor 840 may subsequently turn off GPS determined as having been unnecessarily activated, to deactivate GPS.

As yet another detailed example, it is assumed that at least two applications are configured in advance to be used simultaneously. For example, it is assumed that the terminal 800 is configured in advance to allow a music streaming application to be automatically executed when a navigation application is executed, and allow the music streaming application to be automatically closed when the navigation application is closed.

In this case, the navigation application may perform wireless communication with a GPS wireless network and the music streaming application may perform wireless communication with a mobile wireless network, etc. When the navigation application is closed, the processor 840, as described above, may determine that GPS has been unnecessarily activated, and deactivate GPS. Simultaneously, the processor 840 closes the music streaming application, and may determine that the communication with the mobile wireless network is required to be deactivated since the music streaming application has been closed. The processor 840 may subsequently deactivate the mobile wireless network determined as having been required to be deactivated.

The wireless communication method by the terminal 800 according to an embodiment can deactivate a wireless connection scheme having been unnecessarily activated, so as to enable improvement of power consumption efficiency of the terminal 800.

Meanwhile, the operation 1405 of deactivating an activated wireless connection scheme may further include an operation of producing a GUI configured to receive a user command to permit deactivation of the activated wireless connection scheme. In this case, the produced GUI may be displayed by the display 830. When the user command, activated by the produced GUI, to permit the deactivation of the activated wireless connection scheme is input, the processor 840 may deactivate the activated wireless connection scheme.

In this case, the processor 840 may use a database for storing the user command and, when the same situation occurs afterward, the processor 840 may also deactivate an activated wireless connection scheme on the basis of the database without the user command. That is, the processor 840 may build a database by storing information, in which situation a user deactivates an activated wireless connection scheme, in the memory 820 and, when the same situation occurs afterward, the processor 840 may automatically switch an activated wireless connection scheme to an inactive state on the basis of the built database.

As a more detailed example, it is assumed that GPS of the terminal 800 has been activated by a navigation application, etc. When the navigation application is closed, the processor 840 determines that GPS has been unnecessarily activated, produces a GUI configured to receive a user command to permit deactivation of GPS, and displays the GUI on the display 830. When the user command to permit the deactivation of GPS is input through the GUI displayed on the display 830, the processor 840 may deactivate GPS and store related data in a database. That is, when the navigation application is closed, the processor 840 may store data indicating that a user has deactivated GPS, in the memory 820, and build the database. When the same situation where the navigation application is closed occurs afterward, the processor 840 may directly deactivate GPS without receiving a user command on the basis of the built database. However, even when the navigation application is closed, the user command to permit the deactivation of GPS through the GUI displayed on the display 830 may not input. Even when the navigation application is closed, the processor 840 may store data indicating that the user command to permit the deactivation of GPS has not input, in the memory 820, and build the database. When the same situation where the navigation application is closed occurs afterward, the processor 840 may retain a state in which GPS remains activated on the basis of the built database.

On the other hand, as another example, without receiving any user command, the processor 840 may directly deactivate a wireless connection scheme determined as having been unnecessarily activated.

Meanwhile, the wireless communication method by the terminal 800 according to the present embodiment may further include an operation of reactivating a wireless connection scheme which was determined as having been unnecessarily activated and has been deactivated. That is, the processor 840 may determine again whether the deactivated wireless connection scheme is required to be activated on the basis of information relating to a state of the terminal and information relating to the deactivated wireless connection scheme. When a determination result indicates that the deactivated wireless connection scheme is required to be reactivated, the processor 840 may reactivate the deactivated wireless connection scheme.

As a more detailed example, the example described above, in which GPS of the terminal 800 has been activated but the terminal 800 is in a state of standing still without moving, will be given for additional description. As described above, the processor 840 may determine that GPS of the terminal 800 has been unnecessarily activated, on the basis of the state of the terminal 800 standing still, and may deactivate GPS determined as having been unnecessarily activated. After GPS has been deactivated, the processor 840 may identify a state in which the terminal 800 is moving from a value sensed by the sensor in the terminal 800. In this case, since GPS coordinate values are likely to be changed, the processor 840 may determine that deactivated GPS is required to be reactivated. That is, the processor 840 may determine that GPS of the terminal 800 is required to be reactivated, from information relating to the state of the terminal 800, that is, from the state in which the terminal 800 moves. The processor 840 may subsequently turn on GPS determined as having been required to be activated, to activate GPS.

Even in this case, as described above, the processor 840 may produce a GUI configured to receive a user command to permit activation of a deactivated wireless connection scheme, and may display the GUI on the display 830. In addition, the processor 840 may reactivate or may not reactivate the deactivated wireless connection scheme on the basis of the input user command. The processor 840 may use a database to store the user command. On the other hand, as another example, without receiving any user command, the processor 840 may directly activate a wireless connection scheme determined as having been required to be reactivated.

The processor 840 may produce a GUI configured to receive a user command to confirm information relating to an activated wireless connection scheme, and may display the GUI on the display 830. When the input user command is to confirm information relating to an activated wireless connection scheme, the processor 840 may perform the wireless communication method by the terminal 800 according to an embodiment, which is described above.

Meanwhile, a wireless communication method according to various embodiments described above may be implemented as a computer executable program code and provided to servers or devices in a state in which the program code is stored in various non-transitory computer readable mediums, to allow a processor to execute the program code. As an example, according to various embodiments, a non-transitory computer readable medium which stores a program configured to perform the operations of: storing mapping information between a type of each of multiple wireless networks, a strength of each of signals received from the multiple wireless networks, respectively, and power consumption of a terminal; selecting a wireless network among the multiple wireless networks on the basis of the mapping information and the strength of each of current signals received from the multiple wireless networks, respectively; and communicating with the selected wireless network.

As another example, various embodiments may provide a non-transitory computer readable medium which is to store a program configured to perform the operations of: detecting degradation of Quality of Experience (QoE) of an application running in the foreground; when the degradation of QoE is detected, selecting, among multiple wireless networks, one wireless network different from a wireless network with which the application running in the foreground is communicating; and making the application running in the foreground communicate with the selected wireless network.

As yet another example, various embodiments may provide a non-transitory computer readable medium which stores a program configured to perform the operations of: identifying information relating to an activated wireless connection scheme on the basis of configuration information of a terminal; determining whether the activated wireless connection scheme is required to be activated on the basis of information relating to a state of the terminal and the information relating to the activated wireless connection scheme; and, when the determination result indicates that the activated wireless connection scheme is not required to remain activated, deactivating the activated wireless connection scheme.

The various applications or programs described above may be stored in a non-transitory computer readable medium, such as a CD, a DVD, a hard disk, a Blu-ray disk, a USB, a memory card, a ROM, etc., and provided thereto.

Although specific embodiments have been illustrated and described, it should be appreciated that the present disclosure is not limited thereto. It will be apparent that various modifications and changes may be made by those skilled in the art without departing from the scope of the present disclosure as defined by the appended claims, and these modifications and changes should not be construed separately from the technical idea or view of the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A wireless communication method by a terminal, the method comprising:
    identifying information on a relation between signal strengths of a plurality of wireless networks and power consumption levels corresponding to the signal strengths of the plurality of wireless networks, the plurality of wireless networks using different radio access technologies (RATs);
    measuring current signal strengths of the plurality of wireless networks, respectively;
    obtaining power consumption levels corresponding to the measured current signal strengths of the plurality of wireless networks, respectively, based on the information;
    selecting a wireless network corresponding to a minimum value among the power consumption levels; and
    communicating with the selected wireless network, wherein selecting the wireless network is triggered by at least one of a signal strength of a wireless network communicating with the terminal being changed outside a pre-configured range, a predefined application being activated, or a communication request being received from the predefined application.

2. The method of claim 1, wherein the information further comprises information relating to an operation state of the terminal.

3. The method of claim 2, wherein the power consumption levels further correspond to a current operation state of the terminal.

4. The method of claim 2, wherein the information relating to the operation state of the terminal comprises at least one of information relating to an active state in which data transmission or reception is performed, information relating to an idle state, or information relating to a transition state between the active state and the idle state.

5. The method of claim 1, further comprising updating the information to include power consumption if communication with the selected wireless network is performed.

6. The method of claim 1, wherein determining the power consumption levels comprises determining the power consumption levels by attaching weights corresponding to the measured current signal strengths the plurality of wireless networks, respectively.

7. A terminal comprising:
a transceiver; and
a processor coupled with the transceiver and configured to:
identify information on a relation between signal strengths of a plurality of wireless networks and power consumption levels corresponding to the signal strengths of the plurality of wireless networks, the plurality of wireless networks using different radio access technologies (RATs),
measure current signal strengths of the plurality of wireless networks, respectively,
obtain power consumption levels corresponding to the measured current signal strengths of the plurality of wireless networks, respectively, based on the information,
select a wireless network corresponding to a minimum value among the power consumption levels, and
control the transceiver to communicate with the selected wireless network,
wherein the selecting of the wireless network is triggered by at least one of a signal strength of a wireless network communicating with the terminal being changed outside a pre-configured range, a predefined application being activated, or a communication request being received from the predefined application.

8. The terminal of claim 7, wherein the information further comprises information relating to an operation state of the terminal.

9. The terminal of claim 8, wherein the power consumption levels further correspond to a current operation state of the terminal.

10. The terminal of claim 8, wherein the information relating to the operation state of the terminal comprises at least one of information relating to an active state in which data transmission or reception is performed, information relating to an idle state, or information relating to a transition state between the active state and the idle state.

11. The terminal of claim 7, wherein the processor is further configured to update the information to include power consumption if communication with the selected wireless network is performed.

12. The terminal of claim 7, wherein the processor is configured to determine the power consumption levels by attaching weights corresponding to the measured current signal strengths of the plurality of wireless networks, respectively.

* * * * *